(12) United States Patent
Jaakkola et al.

(10) Patent No.: US 6,880,001 B1
(45) Date of Patent: Apr. 12, 2005

(54) SYSTEM FOR MANAGING AND EXCHANGING TELECOMMUNICATION SYSTEM SUBSCRIBER DATA STORED IN A SINGLE LOGICAL SUBSCRIBER DATABASE

(75) Inventors: Jorma Jaakkola, Vantaa (FI); Mika Sarkki, Vantaa (FI)

(73) Assignee: Sonera Oyj, Helsinki (FI)

( * ) Notice: Subject to any disclaimer, the term of this patent is extended or adjusted under 35 U.S.C. 154(b) by 650 days.

(21) Appl. No.: 09/599,224

(22) Filed: Jun. 22, 2000

(30) Foreign Application Priority Data

Dec. 31, 1997 (FI) ................................................ 974655
Dec. 29, 1998 (WO) ............................... PCT/FI98/01026

(51) Int. Cl.$^7$ .......................................... G06F 15/173
(52) U.S. Cl. ...................................... 709/223; 709/217
(58) Field of Search ............................... 709/223, 217, 709/232; 707/10

(56) References Cited

U.S. PATENT DOCUMENTS

| | | | | |
|---|---|---|---|---|
| 5,761,662 A | * | 6/1998 | Dasan ........................... | 707/10 |
| 5,828,959 A | * | 10/1998 | Soderbacka .................. | 455/445 |
| 6,163,809 A | * | 12/2000 | Buckley ....................... | 709/237 |
| 6,470,010 B1 | * | 10/2002 | Szviatovszki et al. ....... | 370/356 |
| 6,515,997 B1 | * | 2/2003 | Feltner et al. ............... | 370/401 |
| 6,564,264 B1 | * | 5/2003 | Creswell et al. ............ | 709/245 |

FOREIGN PATENT DOCUMENTS

| | | |
|---|---|---|
| WO | WO 95/09514 | 4/1995 |
| WO | WO 96/38018 | 11/1998 |

OTHER PUBLICATIONS

Thomas Kostas, Michael Borella, Ikhla sidhu, Guido Schuster, Jacek Grabiec and Jerry Mahler, "Real Time Voice over Packet–Switched Networks", IEeENetwork Jan./Feb. 1998, pp. 18–27.*

* cited by examiner

*Primary Examiner*—Le Hien Luu
(74) *Attorney, Agent, or Firm*—Cohen, Pontani, Lieberman & Pavane

(57) ABSTRACT

A system and method for the management of telecommunication system subscriber data in conjunction with at least two duplex telecommunication networks handling separate subscriber data. The inventive system includes means for linking the system, in a transparent manner with respect to telecommunication network architecture, to telecommunication network elements handling subscriber data, means for storing the subscriber data of different telecommunication networks in the same logical database, and means for exchanging subscriber data between the telecommunication network elements handling subscriber data and/or the subscriber database. The system may for example be used to implement a subscriber accessibility service between and operable across different networks.

17 Claims, 2 Drawing Sheets

SYSTEM FOR MANAGING AND EXCHANGING TELECOMMUNICATION SYSTEM SUBSCRIBER DATA STORED IN A SINGLE LOGICAL SUBSCRIBER DATABASE

BACKGROUND OF THE INVENTION

1. Field of the Invention

The present invention relates to telecommunications and, in particular, to new and advanced methods and systems for the management of subscriber data in telecommunication networks.

2. Description of Related Art

An existing problem with the services currently provided in or via various telecommunication networks—as, for example, GSM (Global System for Mobile communications) networks, PSTN (Public Switched Telephone Network), and the Internet—is a that they are network-specific, i.e. designed to work in only a particular network. Thus, by way of significant illustration each network has different practices for the handling of subscriber data. Subscriber locating services are tied to their target network and the accessibility of a subscriber can only be determined or treated within a given network. A person may therefore for example be accessible via the Internet at a location at which no paging network can be used.

OBJECTS AND SUMMARY OF THE INVENTION

It is accordingly the desideratum of the present invention to eliminate and overcome the drawbacks and deficiencies of the prior art as described, by way of example, hereinabove.

It is a particular object of the invention to provide a new type of system and procedure in which subscriber data and network-provided or accessible services are available between different networks and in which the services can be directed to use the network currently serving the subscriber irrespective of the particular network interface. The invention accordingly makes it possible to create, for example, an accessibility service operable between different networks having different data types and architectures.

The system of the present invention transmits and modifies subscriber data in as conjunction with at least two duplex telecommunication networks handling different subscriber data. Each telecommunication network may be one of, for example, a public telephone network, a digital multi-service network, a public mobile communication network, a paging network, a message service network, a telex network, or an IP (Internet Protocol)-based network. The inventive system comprises means for connecting the system, transparently in respect of the telecommunication system architecture, to telecommunication network elements handling subscriber data. As used herein the term "transparently" is intended to denote that the system does not require any changes in the architecture of the existing networks.

The inventive system includes means for storing the subscriber data for different telecommunication networks in the same logical database. The data of the database may be distributed among different elements while still essentially forming part of an entity interpreted as a single logical database.

The inventive system may be variously configured in a multiplicity of preferred forms and embodiments. Thus, the system may include means for the transmission of signaling between different telecommunication networks. The system may also or alternatively include means for converting among multiple data types so that the data types of all subscriber data are compatible with the database present in the inventive system and with the data type(s) of a network element of the telecommunication network that is linked to the system.

The system may furthermore include means for forming a service profile for a subscriber; utilizing the service data for each subscriber, it is thereby possible to determine the network and service(s) that the subscriber prefers to use. The inventive system may also include means for insuring uninterrupted operation, a particularly important feature where the system provides a critical component with respect to network-independent services.

The inventive system may also be implemented directly in the subscriber's terminal device, in which case the available services are implemented and activated separately in each terminal device of a subscriber, taking the properties of each network into account. Such means implementing the inventive functionality may also be provided as a part of a network element, or as a module which is added to a network element of an existing telecommunication network.

The inventive system advantageously provides a uniform external interface to service user or subscriber information for use, by way of example, in customer management systems. Through implementation of the inventive system it is possible to create a new and more advanced subscriber accessibility service through which the subscriber can be reached via a single interface from different telecommunication networks. The inventive system saves network capacity, and subscriber search from other networks can be accomplished as a simple database search without having to first set up a complete telecommunication connection. Subscriber data can moreover be practically managed in real time as the system is connected with elements exchanging subscriber data. As a consequence, a search service may be implemented as a single exchange of characters.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters identify similar elements throughout the several figures.

DETAILED DESCRIPTION OF THE CURRENTLY PREFERRED EMBODIMENTS

The handling of subscriber location data in accordance with the present invention will now be described by way of a preferred example and with initial reference to FIG. 2. In this embodiment, the system 2 of the invention is added to an existing or otherwise conventional GSM network 3 by connecting it between the Mobile services Switching Center/Visitor Location Register (MSC/VLR) 4 and the Home Location Register (HLR) 5 via an interface or linking or connection means 1a. When the MSC/VLR 4 exchanges information with the HLR 5, the communication is transmitted through and via the interface 1a of system 2, which selectively picks out the required data from the communication and further transmits the communication from MSC/VLR 4 to HLR 5 without altering the messages or message content therein contained. In this manner the system 2 has obtained subscriber location data by filtering the normal communications between the MSC/VLR and HLR in the GSM network 3.

Figure 1:
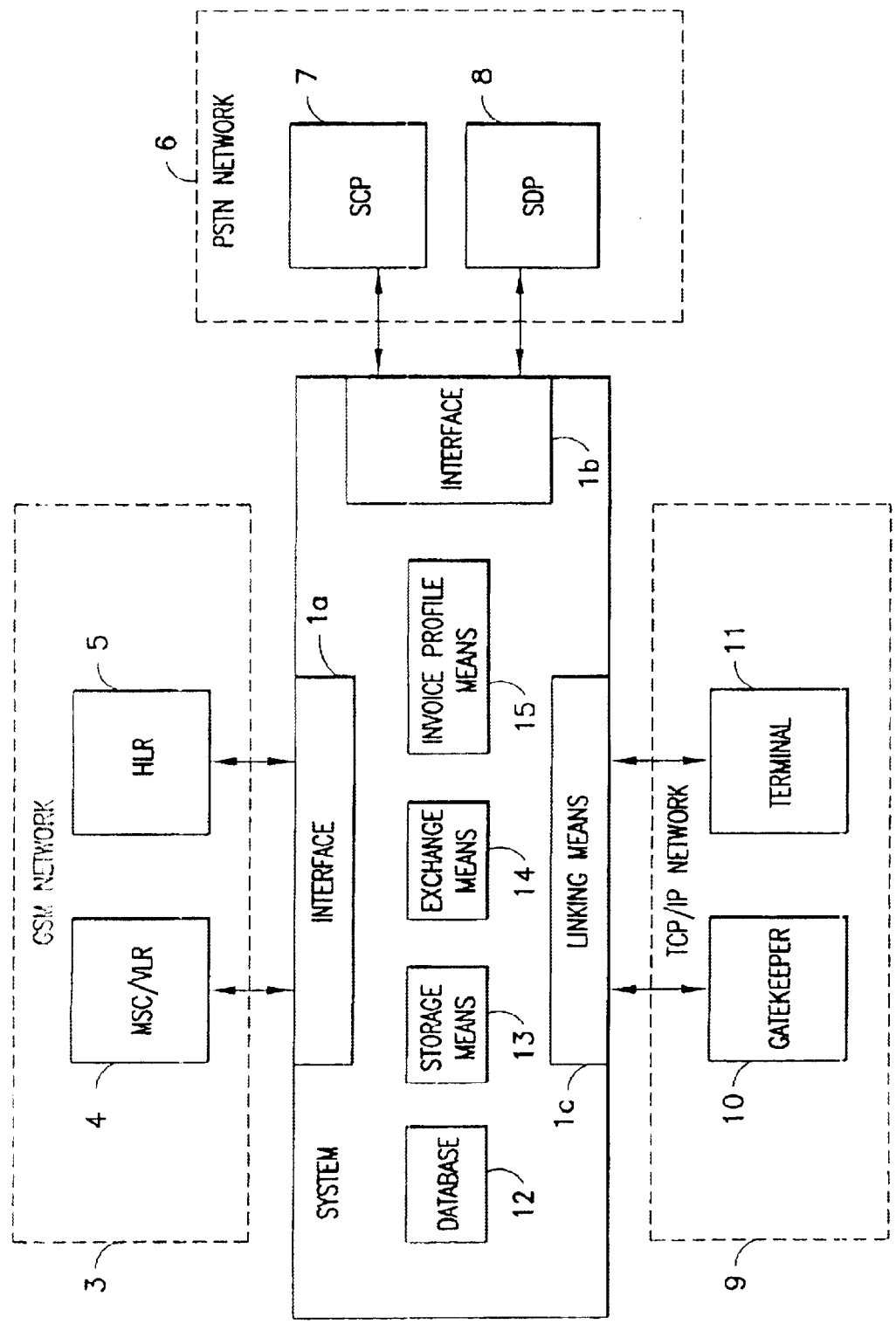
FIG. 1 is a block diagram of a system in accordance with the present invention and connected to a plurality of telecommunication networks.

Referring now also to FIG. 1, the obtained or otherwise available subscriber location information is stored in a database 12 of system 2 by operative storage means 13 which functions to store the information in a manner forming a single logical database. This information may for example be utilized in an Intelligent Network (IN) service provided in a PSTN network 6 (to which the system 2 is also connected) in which a Service Control Point (SCP) 7 sends a subscriber data inquiry to a service data point (SDP) 8. As with the GSM network 3, instead of being passed directly from service control point 7 to service data point 8, the inquiry is directed by another interface or linking or connection means 1b to system 2, which can immediately respond to the inquiry by returning the requested subscriber data to SCP 7 or direct or forward the original inquiry on to service data point 8. In the latter case, after receiving a response from service data point 8 the system 2 can add desired or predetermined information to the data obtained from service data point 8, store within system 2 the relevant information returned from service data point 8, and then return the response—either altered or unaltered—to service control point 7.

A corresponding procedure can similarly be applied in a TCP/IP (Transmission Control Protocol/Internet Protocol) network 9, to which the system 2 may be likewise connected for use as, by way of example, a server for various directory services. In the FIG. 1 embodiment the system 2 is connected via a third interface or linking or connection means 1c to the TCP/IP network 9 between a terminal 11 and a gatekeeper 10 as defined by the ITU H.323 standard series. The terminal 11 logs on into the gatekeeper 10 and queries for information concerning call setup. These communications are transmitted through or via interface 1c of the inventive system 2, which filters the required data from the communication, the data then being stored by system 2. Exchanges of information between the terminal 11 and gatekeeper 10 are otherwise effected in the same manner as takes place in a conventional network in which the inventive system 2 is not present.

By virtue of the method of the invention as hereinabove described, it is accordingly possible to readily implement a subscriber accessibility service that is considerably more advanced than that available in current systems. When someone is trying to reach a subscriber, as for example via the GSM network, he or she may leave a message on the subscriber's telephone answering machine. Based on the subscriber's service profile formed or identified using the means 15 of the inventive system 2, this message is transferred to the network considered best or most appropriate to the task or desired result or functionality, such by way of example to the Internet where the message left on the answering machine may be converted to an electronic mail message. The inventive system 2 always contains current information about or relating to or defining the subscriber data of each network; thus, for example, a subscriber's current location can be determined from the stored location data for use in implementing an answering service function or service.

The load on the system of the invention can also easily be managed because, in current networks, subscribers may be distributed among different network components containing subscriber data so that only data for subscribers using network-independent services and the associated search and processing operations are routed via the inventive system through the use of suitable signaling. The system 2 thus includes communication or information exchange means 14 for the transmission of such signaling and exchanges of information.

The essential feature of the inventive system 2 is that it concentrates subscriber data, including subscriber location and service data, in the same system that has access to the signaling of different telecommunication networks. As should now be apparent, the system 2 functions as a gateway between different networks. Since the subscriber data of all of the networks that have joined the system are collected in the same logical database, a telecommunication connection between different networks can be set up directly between the various networks, irrespective of their individual architectures or utilized data or signalling types or formats, without having to separately check the subscriber data via a third network. In practice, the system 2 also works in real time, thus differing from prior art arrangements and procedures in which subscriber data is handled by batch processing, i.e. by collecting subscriber data for several subscribers at the same time.

Figure 2:
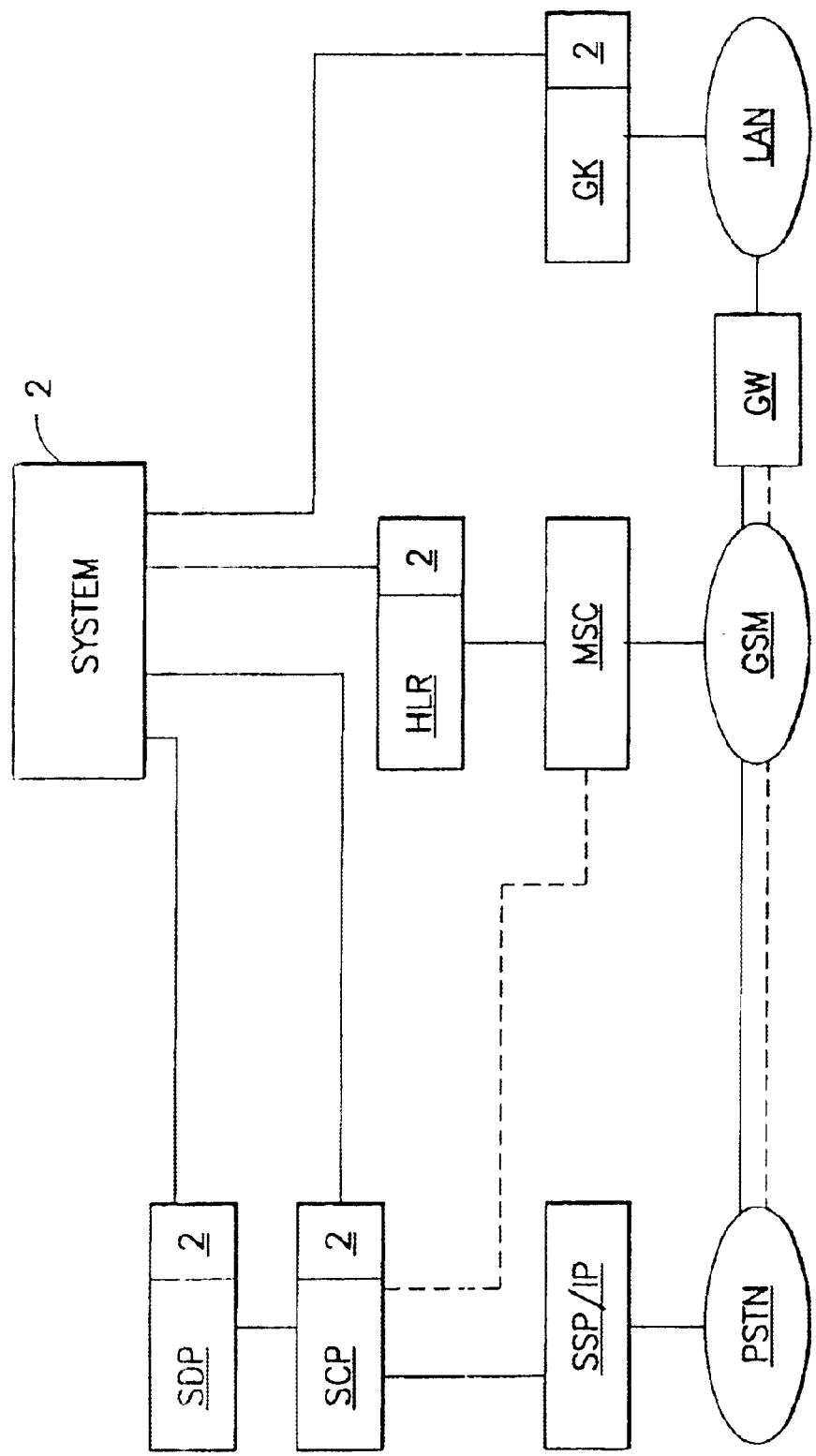
FIG. 2 is a block diagram of a system, implemented as a part of existing network elements, in accordance with another embodiment of the invention.

FIG. 2 depicts a system in accordance with the invention in which the various operating and functional means utilized in and that form the system are implemented as part of the existing network elements. The system 2 is thus physically distributed across a multiplicity of existing network elements, i.e. as additional modules that are built into different existing network elements, to variously implement the novel functions and features of the system 2. Various existing telecommunication network elements may include a Local Area Network (LAN) and a Service Switching Point (SSP/IP).

The present application is based at least in part on commonly-owned Finnish patent application No. FI 980667, filed Mar. 25, 1998, the entire content and disclosure of which are expressly incorporated by reference herein.

While there have shown and described and pointed out fundamental novel features of the invention as applied to preferred embodiments thereof, it will be understood that various omissions and substitutions and changes in the form and details of the methods and procedures described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A data management system for management of telecommunication system subscriber data in a telecommunication system having first and second duplex telecommunication networks, wherein each telecommunication network of the first and second duplex telecommunication networks contains subscriber data including subscriber location and service data for each subscriber of the each telecommunication network, the subscriber data for the each telecommunication network having a unique format in accordance with a telecommunication network architecture for the each telecommunication network, said data management system comprising:

a.) means for linking the data management system, in a transparent manner with respect to the telecommunication network architecture of the first and second telecommunication networks, to telecommunication network elements of the first and second telecommunication networks handling subscriber data;

b.) means for storing the subscriber data of the first and second telecommunication networks in a single logical subscriber database; and c.) means for exchanging subscriber data:
   (i.) between the telecommunication network elements of the first and second telecommunication networks handling subscriber data;
   (ii.) between the telecommunication network elements handling subscriber data and the single logical subscriber database; and
   (iii.) between the telecommunication network elements within one of the first and second telecommunication networks handling subscriber data.

2. The data management system of claim 1, further comprising:

d.) means for transmission of signaling between the first and second telecommunication networks.

3. The data management system of claim 2, further comprising:

e.) means for converting data formats between each of the first and second telecommunication networks and the subscriber database.

4. The data management system of claim 1, further comprising:

d.) means for converting data formats between each of the first and second telecommunication networks and the subscriber database.

5. The data management system of claim 1, further comprising:

d.) means for forming a service profile for a subscriber of one of the first and second telecommunication networks.

6. The data management system of claim 1, wherein at least one of said linking means, said storing means, and said exchanging means is implemented as a part of a network element of at least one of the first and second telecommunication networks.

7. The data management system of claim 1, wherein at least one of the first and second telecommunication networks includes a terminal device for use by a network subscriber to establish a telecommunication connection, said system being implemented in the terminal device.

8. The data management system according to claim 1, wherein said first and second duplex telecommunication networks are selected from the group consisting of: a public telephone network; a digital multi-service network; a public mobile communication network; a paging network; a message service network; a telex network; and an Internet Protocol (IP).

9. The data management system according to claim 1, which operates in real time.

10. A method for managing telecommunication network subscriber data with a data management system in a telecommunication system having first and second duplex telecommunication networks, wherein each telecommunication network of the first and second duplex telecommunication networks contains subscriber data including subscriber location and service data for each subscriber of the each telecommunication network, the subscriber data for the each telecommunication network having a unique format in accordance with a telecommunication network architecture for the each telecommunication network, said method comprising the steps of:

a.) establishing a connection, transparent with respect to the telecommunication network architecture of the first and second telecommunication networks, from the data management system to telecommunication network elements of the first and second networks handling subscriber data;

b.) storing subscriber data of the first and second telecommunication networks in a single logical subscriber database in the data management system; and c.) exchanging subscriber data:
   (i.) between the telecommunication network elements of the first and second telecommunication networks handling subscriber data;
   (ii.) between the telecommunication network elements handling subscriber data and the single logical subscriber database; and
   (iii.) between the telecommunication network elements within one of the first and second telecommunication networks handling subscriber data.

11. The method of claim 10, further comprising the step of:

d.) transmitting signaling between the first and second telecommunication networks.

12. The method of claim 11, further comprising the step of:

e.) converting data formats between each of the first and second telecommunication networks and the single logical subscriber database.

13. The method of claim 10, further comprising the step of:

d.) converting data formats between each of the first and second telecommunication networks and the single logical subscriber database.

14. The method of claim 10, further comprising the step of:

d.) forming a service profile for a subscriber of one of the first and second telecommunication networks.

15. The method according to claim 10, wherein at least one of said steps (a.), (b.), and (c.) is performed utilizing existing elements of the first and second telecommunication networks.

16. The method according to claim 10, as applied to a telecommunication system wherein said first and second telecommunication networks are selected from the group consisting of: a public telephone network; a digital multi-service network; a public mobile communication network; a paging network; a message service network; a telex network; and an Internet Protocol (IP).

17. The method according to claim 10, which is executed in real time.

* * * * *

UNITED STATES PATENT AND TRADEMARK OFFICE
CERTIFICATE OF CORRECTION

| | |
|---|---|
| PATENT NO. | : 6,880,001 B1 |
| APPLICATION NO. | : 09/599,224 |
| DATED | : April 12, 2005 |
| INVENTOR(S) | : Jorma Jaakkola et al. |

It is certified that error appears in the above-identified patent and that said Letters Patent is hereby corrected as shown below:

Column 1,
Line 7, before the heading "Background of the Invention", insert the following:

-- This is a continuation of PCT Application No. PCT/Fl98/01026, filed on December 29, 1998, which claims priority from Finland Application No. FI 974655, filed December 31, 1997. --.

Signed and Sealed this

Fourth Day of July, 2006

JON W. DUDAS
*Director of the United States Patent and Trademark Office*